United States Patent
Carbajal et al.

(10) Patent No.: US 6,725,373 B2
(45) Date of Patent: *Apr. 20, 2004

(54) METHOD AND APPARATUS FOR VERIFYING THE INTEGRITY OF DIGITAL OBJECTS USING SIGNED MANIFESTS

(75) Inventors: John M. Carbajal, Portland, OR (US); Gary Graunke, Beaverton, OR (US); Carlos Rozas, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,231

(22) Filed: Mar. 25, 1998

(65) Prior Publication Data

US 2002/0002680 A1 Jan. 3, 2002

(51) Int. Cl.[7] .................................................. H04L 9/32
(52) U.S. Cl. ...................... 713/179; 713/176; 713/167
(58) Field of Search ................................ 713/167, 176, 713/179

(56) References Cited

U.S. PATENT DOCUMENTS

| | | | | | |
|---|---|---|---|---|---|
| 4,907,270 | A | * | 3/1990 | Hazard | 380/23 |
| 5,301,316 | A | * | 4/1994 | Hamilton et al. | 364/245.8 |
| 5,367,573 | A | * | 11/1994 | Quimby | 380/25 |
| 5,373,561 | A | * | 12/1994 | Haber et al. | 380/49 |
| 5,479,509 | A | * | 12/1995 | Ugon | 380/23 |
| 5,661,805 | A | * | 8/1997 | Miyauchi | 380/23 |
| 5,850,451 | A | * | 12/1998 | Sudia | 380/49 |
| 5,852,666 | A | * | 12/1998 | Miller et al. | 380/4 |

OTHER PUBLICATIONS

Bruce Schneier, Applied Cryptography, 1996, pp. 165–166 and 193–197.*

* cited by examiner

Primary Examiner—Gilberto Barrón
Assistant Examiner—Douglas J. Meislahn
(74) Attorney, Agent, or Firm—Blakely, Sokoloff, Taylor & Zafman LLP

(57) ABSTRACT

A method for generating a signed manifest includes referencing an object. A metadata name is recorded. A digest algorithm is recorded. An integrity value that belongs to the object that corresponds to the metadata subject name is digested with the digest algorithm.

20 Claims, 7 Drawing Sheets

| METADATA NAME | DEFINITION |
|---|---|
| 501 → INTERGITY-VERIFY DATA: REFERENCE | HASH ONLY THE REFERENCE, EXCLUDE CONTENTS. |
| 502 → INTERGITY-VERIFY DATA: REFERENCE-VALUE | HASH BOTH REFERENCE AND CONTENTS. |
| 503 → INTERGITY-VERIFY DATA: NAMED SECTION VALUE | HASH THE CONTENTS IDENTIFIED BY THE NAMED SECTION. |
| 504 → INTERGITY-NAMED SECTION: XXX | IDENTIFIES A SECTION TO BE HASHED. |
| 505 → INTERGITY-VERIFY INTEGRITY: MATCH | INDICATES THAT THE HASH VALUE COMPUTED MUST MATCH ONE OF THE VALUES LISTED. |
| 506 → INTERGITY-RESOURCE PROXY: XXX | INFORMS THE INTEGROTY VERIFICATION UNIT THAT THE OBJECT MAY BE FOUND AT THIS LOCATION. |
| 507 → INTERGITY-TRUSTED SIGNER: XXX | INFORMS THE INTEGRITY VERIFICATION UNIT THAT THE OBJECT IS DYNAMIC DATA AND THAT THE SOURCE IS TRUSTABLE. |

*FIG. 5*

METHOD AND APPARATUS FOR VERIFYING THE INTEGRITY OF DIGITAL OBJECTS USING SIGNED MANIFESTS

FIELD OF THE INVENTION

The present invention relates to the field of computer systems. More specifically, the present invention relates to a method and apparatus for verifying the integrity of digital objects transmitted between computer systems.

BACKGROUND

Advancing technology has created opportunities for near-instantaneous, global exchange of voluminous amounts of information and data. However, the lack of a secure medium for data transmission has created opportunities for fraud, deception, and theft through the manipulation of records. Individuals and businesses are using various encoding schemes to generate digital signatures to verify the integrity of digital objects transmitted. Digital signatures may be used to enable a party receiving a transmitted object to identify who sent an object and whether the object had been altered in route.

Digital signatures are created and verified by means of cryptography. A private key is used to create the digital signature and is kept in confidence by the object sender. A public key is used to verify the digital signature and is known to the object recipient. Digital signature creation is the process of computing a code derived from and unique to a transmitted object and a given private key. Digital signature verification is the process of checking the digital signature by reference to the original object and a public key and determining whether the digital signature was created for that same message using the private key. If a public and private key pair is associated with an identified signer, a digital signature created with the private key effectively identifies the signer with the message. The process of digitally signing also identifies the matter to be signed. Verification reveals tampering with the message, since processing the hash results discloses whether the message is the same as when signed.

SUMMARY OF THE INVENTION

A method for generating a signed manifest is disclosed. An object is referenced. A metadata name is recorded. A digest algorithm is recorded. An integrity value that belongs to the object that corresponds to the metadata subject name is digested with the digest algorithm.

BRIEF DESCRIPTION OF THE DRAWINGS

The present invention is illustrated by way of example and not by way of limitation in the figures of the accompanying drawings, in which the like references indicate similar elements in and in which:

FIG. 1 illustrates an exemplary network upon which an embodiment of the present invention is implemented on;

FIG. 5 illustrates a table that shows exemplary metadata names and their definitions according to an embodiment of the present invention;

DETAILED DESCRIPTION

Figure 1:
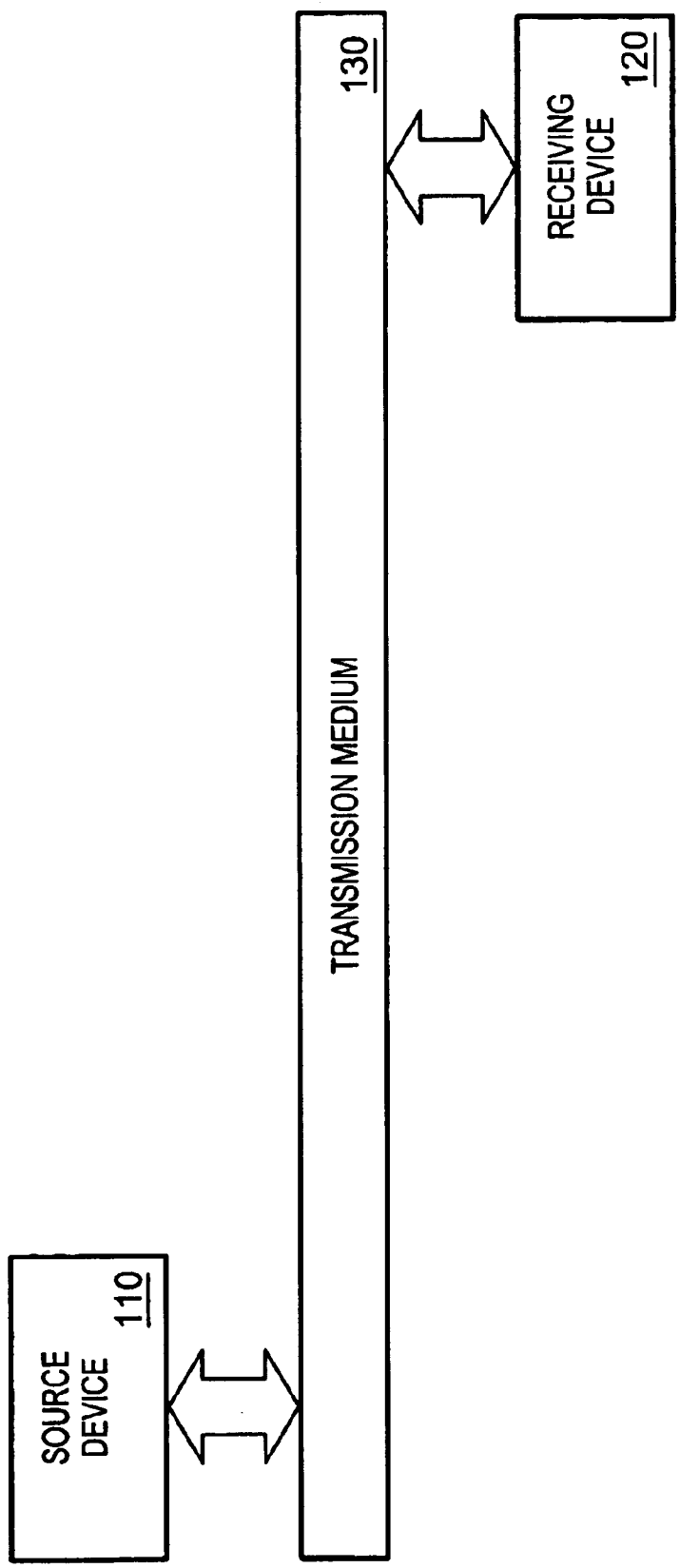

FIG. 1 illustrates an exemplary network 100 upon which an embodiment of the present invention is implemented. Computer system 110 operates as a source device that sends an object to computer system 120 that operates as a receiving device. The object may be, for example, a data file, an executable, or other digital objects. The object is sent via data transmission medium 130. The data transmission medium 130 may be one of many mediums such as an internal network connection, an internet connection, or other connections. The transmission medium 130 may be connected to a plurality of untrusted routers (not shown) and switches (not shown) that may compromise the integrity of the object transmitted. The computer system 110 sends a signed manifest along with the object to the computer system 120. The signed manifest is a document that attests to the object's integrity. According to an embodiment of the present invention, the signed manifest includes a digest value generated from applying a digest algorithm on an integrity value from the object, and instructions on how to recompute the digest values. The signed manifest may be used by the computer system 120 to verify the integrity of the object.

Figure 2:
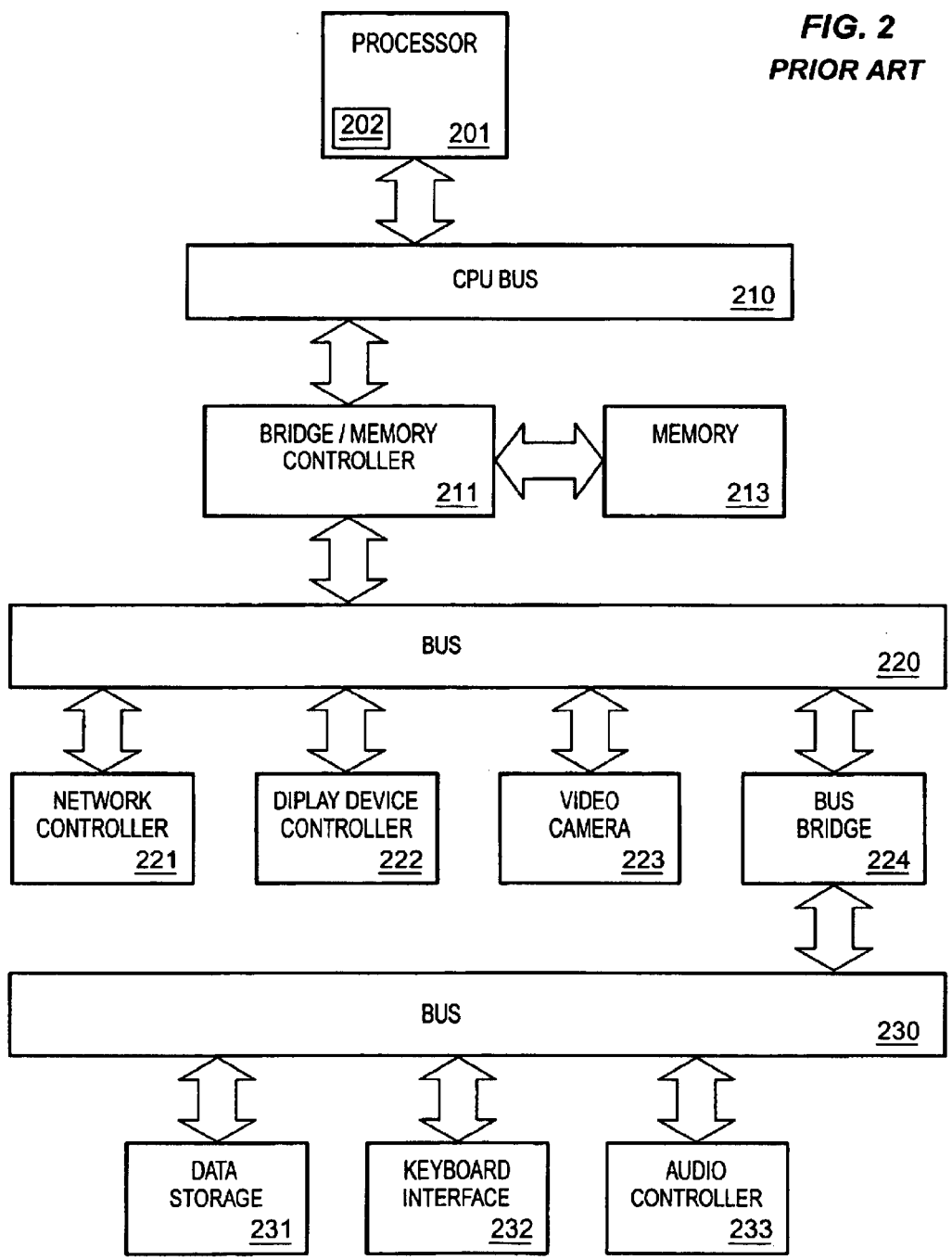
FIG. 2 is a block diagram of a computer system implementing an embodiment of the present invention.

Referring to FIG. 2, a computer system upon which an embodiment of the present invention can be implemented is shown as 200. The computer system 200 may be implemented as the computer system 110 (shown in FIG. 1) or the computer system 120 (shown in FIG. 1). The computer system 200 includes a processor 201 that processes data signals. The processor 201 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 that transmits data signals between processor 201 and other components in the computer system 200.

The computer system 200 includes a memory 213. The memory 213 may be a dynamic random access memory (DRAM) device, a static random access memory (SRAM) device, or other memory device. The memory 213 may store instructions and code represented by data signals that may be executed by the processor 201. A cache memory 202 resides inside processor 201 that stores data signals stored in memory 213. The cache 202 speeds up memory accesses by the processor 201 by taking advantage of its locality of access. In an alternate embodiment of the computer system 200, the cache 202 resides external to the processor 201.

A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first I/O bus 220.

The first I/O bus 220 may be a single bus or a combination of multiple buses. As an example, the first I/O bus 220 may comprise a Peripheral Component Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers (not shown in FIG. 2) and supports communication among the machines. A display device controller 222 is coupled to the first I/O bus 220. The display device controller 222 allows coupling of a display device to the computer system 200 and acts as an interface between the display device and the computer system 200. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200. A video camera 223 is coupled to the first I/O bus 220.

A second I/O bus 230 may be a single bus or a combination of multiple buses. As an example, the second I/O bus 230 may comprise a PCI bus, a PCMCIA bus, a NuBus, an Industry Standard Architecture (ISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, a flash memory device or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. An audio controller 233 is coupled to the second I/O bus 230. The audio controller 233 operates to coordinate the recording and playing of sounds is also coupled to the I/O bus 230.

A bus bridge 224 couples the first I/O bus 220 to the second I/O bus 230. The bus bridge 224 operates to buffer and bridge data signals between the first I/O bus 220 and the second I/O bus 230.

The present invention is related to the use of the computer system 200 to facilitate the verification of the integrity of objects. According to one embodiment, facilitating the verification of the integrity of objects is performed by the computer system 200 in response to the processor 201 executing sequences of instructions in main memory 213. Such instructions may be read into memory 213 from another computer-readable medium, such as data storage device 231, or from another source via the network controller 221. Execution of the sequences of instructions causes the processor 201 to facilitate the verification of the integrity of objects, as will be described hereafter. In an alternative embodiment, high-wired circuitry may be used in place of or in combination with software instructions to implement the present invention. Thus, the present invention is not limited to any specific combination of hardware circuitry and software.

Figure 3:
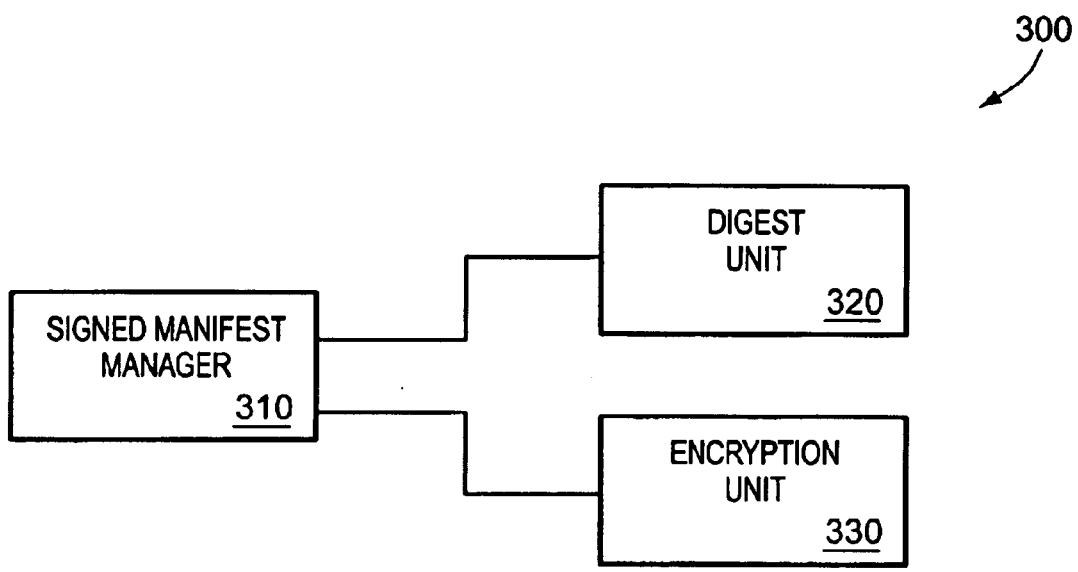
FIG. 3 is a block diagram illustrating modules implementing an object integrity verification unit according to an embodiment of the present invention.

FIG. 3 is a block diagram illustrating modules implementing an object integrity verification unit 300 according to an embodiment of the present invention. In a preferred embodiment of the present invention, the modules are implemented by software and reside in main memory 213 (shown in FIG. 2) as sequences of instructions. It should be appreciated that the modules may also be implemented by hardware as components coupled to the bus 220 (shown in FIG. 2) or a combination of both hardware and software.

According to an embodiment of the present invention, the object integrity verification unit 300 operates to build signed manifests for objects to be transmitted by a computer system. The signed manifest describes the integrity and authenticity of an object or a collection of objects where the collection is specified as an acyclic connected graph with an arbitrary number of nodes representing arbitrary typed objects. A computer system receiving the transmitted object may use the transmitted signed manifest to verify the integrity and authenticity of the object. Block 310 represents a signed manifest manager. The signed manifest manager 310 generates a manifest section for an object that the computer system transmits. According to an embodiment of the present invention, the signed manifest manager 310 generates a manifest section for each object in a collection of objects that the computer system transmits. In each manifest section, the signed manifest manager 310 records a reference to an object and a metadata name. Metadata names are classes of attributes that relate to objects. Attributes of an object may include a source, version number, date of creation or other characteristics of an object. Each object has an integrity value that corresponds to a metadata name. The integrity value corresponding to a metadata name is the actual attribute of the object. For example, an integrity value of an object that corresponds to a metadata name specifying source may be an Internet Protocol (IP) address or a Uniform Resource Locator (URL). The signed manifest manager 310 also records a digest algorithm that is to be used to digest an integrity value corresponding to the specified metadata name that is stored in the manifest section. A digest algorithm may be any known mathematical algorithm that may be used to generate a coded message from uncoded data. The digest algorithm may be for example a hash function such as Secure Hash Algorithm 1 (SHA1), Message Digest 5 (MD5), or other algorithms. It should be appreciated that the metadata name and digest algorithm recorded in the manifest section by the signed manifest manager 310 may be specified by user input or by an application running on the computer system 200 (shown in FIG. 2). The signed manifest manager 310 may also record additional attributes of the object in the signed manifest.

Block 320 represents a digest unit 320. The digest unit is coupled to the signed manifest manager 310. The digest unit 320 receives the metadata name and the digest algorithm specified by the signed manifest manager 310. The digest unit 320 digests the integrity value that corresponds to the metadata name with the digest algorithm. The digest unit 320 records the digested integrity value in the manifest section.

According to an embodiment of the present invention, the signed manifest manager 310 generates a signer information section for each manifest section in the signed manifest. In each signer information section, the signed manifest manager 310 records a reference to the signer information section's corresponding manifest section. The signed manifest manager 310 also records a digest algorithm that is to be used to digest the manifest section. In this embodiment of the present invention, the digest unit 320 receives the manifest section and digests the manifest section with the digest algorithm. The digest unit 320 writes the digested manifest section in the signer information section. It should be appreciated that the signer information section may be generated by an integrity verification unit 300 on a computer system that generated the manifest section or by another integrity verification unit 300. When the signer information section is generated by an integrity verification unit 300 on a computer system different from the one that generated the manifest section, the signer information section may be used to include additional attributes of the object not included in the manifest section.

According to an embodiment of the present invention, the signed manifest manager 310 also generates a signature block. The signed manifest manager 310 specifies a digest algorithm to digest information to be stored in the signature block. In this embodiment of the present invention, the digest unit 320 receives the digest algorithm specified by the signed manifest manager 310 and the signer information section and digests the signer information section with the digest algorithm.

Block 330 represents an encryption/decryption unit 330. The encryption/decryption unit 330 is coupled to the signed manifest manager 310. The encryption/decryption unit 330 receives the digested signer information section from the signed manifest manager 310 and encrypts the digested signer information section using a private key. The encryption/decryption unit 330 writes the encrypted digested signer information section in the signature block.

According to an embodiment of the present invention, the object integrity verification unit 300 operates to verify the integrity of an object received using the signed manifest corresponding to the object. The object integrity verification unit 300 verifies the integrity of an object by verifying the integrity of the signed manifest and checking the integrity of the object with data in the signed manifest.

In verifying the integrity of the signed manifest, the signed manifest manager 310 retrieves the digest algorithm used to digest the signer information section in the signature block and forwards the digest algorithm to the digest unit 320. The digest unit 320 computes the digest value of the signer information using the digest algorithm indicated in the signature block. The encryption/decryption unit 330 uses a public key to decrypt the encrypted digested signer information section in the signature block of the signed manifest. The signed manifest manager 310 compares the computed digest value with the digested signer information section in the signature block. If the computed digest value and the digested signer information in the signature block match, the signer information section of the signed manifest is presumed to be valid. Next, the signed manifest manager 310 retrieves the digest algorithm used to digest the manifest section in the signer information section and forwards the manifest section and the digest algorithm to the digest unit 320. The digest unit 320 computes the digest value of the manifest section using the digest algorithm indicated in the signature information section. The signed manifest manager 310 compares the computed digest value with the digest value in the signature information section. If the computed digest value and the digest value in the signer information section matches, the manifest section of the signed manifest is presumed to be valid.

In checking the integrity of the object with data in the signed manifest, the signed manifest manager 310 retrieves the metadata name recorded in the manifest section and the digest algorithm used to digest its corresponding integrity value and forwards this to the digest unit 320. The metadata name and digest algorithm operate as instructions on how to compute the digest value of the object. The digest unit 320 computes the digest value of the object using the digest algorithm indicated in the manifest section. The signed manifest manager 310 compares the computed digest value with the digest value in the manifest section. If the computed digest value and the digest value in the manifest section matches, the integrity of the object is presumed to be valid.

In the embodiment of the present invention where the signed manifest manager 310 generates a manifest section for each object in a collection of objects, the signed manifest operates as digital packaging. The manifest sections in the manifest references each of the objects to group the collection of objects together. The metadata used in each object to generate digest values or attributes included in a manifest section may include information used to indicate the source and version number of each object as a logo or label would. The digital signature in the signature block provides a safeguard for determining whether the integrity of the objects are intact as a sealed box or shrink wrap would.

The signed manifest manager 310, the digest unit 320, and the encryption unit 330 may be implemented by any known circuitry or any known technique. In an embodiment of the present invention where the signed manifest manager 310, the digest unit 320, and the encryption unit 330 are implemented by hardware, the signed manifest manager 310, the digest unit 320, and the encryption unit 330 all reside on a same silicon substrate.

Figure 4:
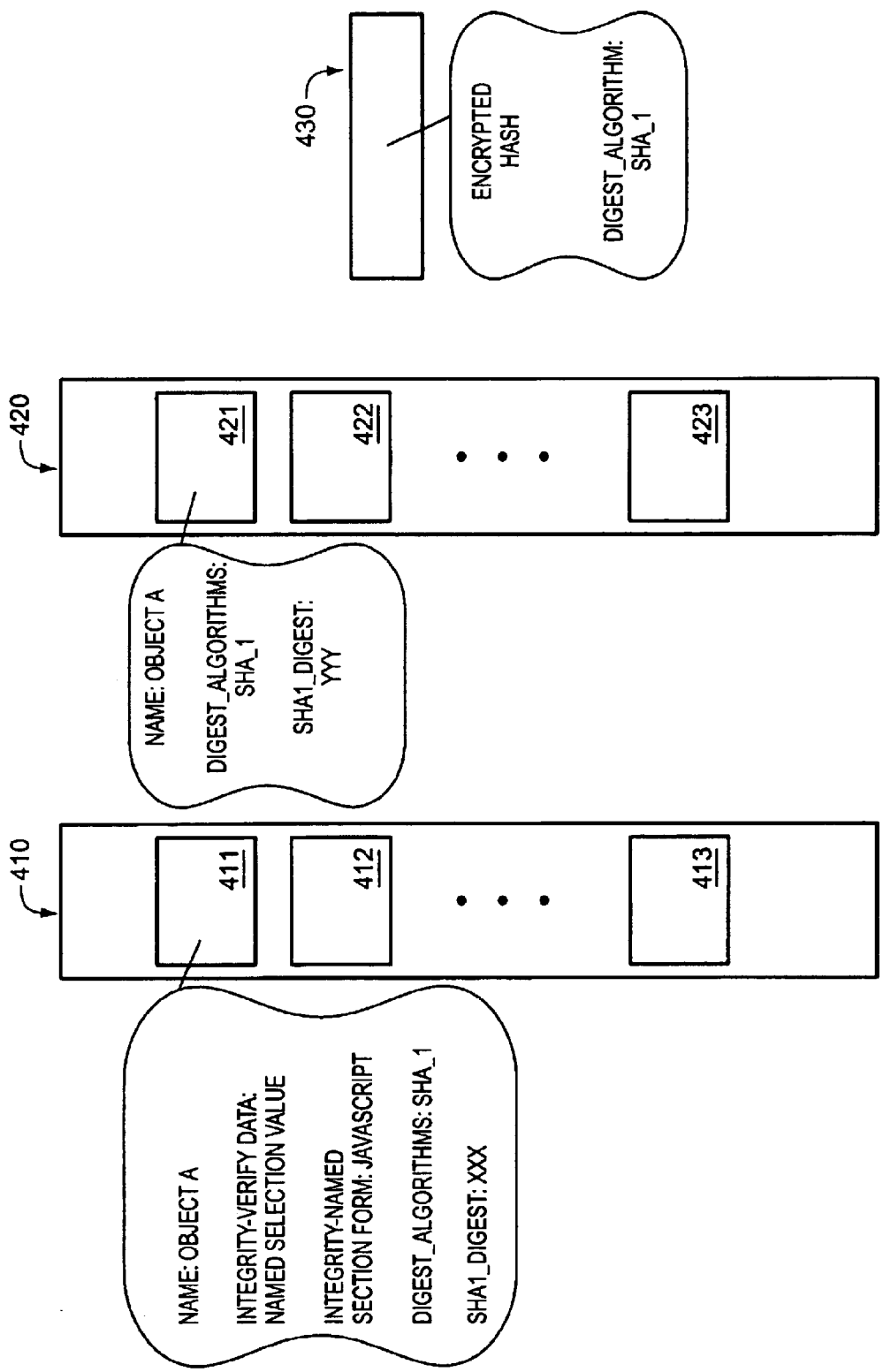
FIG. 4 illustrates an exemplary signed manifest according to an embodiment of the present invention.

FIG. 4 illustrates an exemplary signed manifest 400 according to an embodiment of the present invention. The signed manifest 400 includes a manifest block 410 that includes one or more manifest sections 411–413. The manifest block 410 may describe a collection of objects. Each manifest section may refer to an object in a collection of objects. The manifest section may also include a metadata name related to the object, a name of a digest algorithm used to digest an integrity value corresponding to the metadata name, and the digested integrity value which operates as the integrity of the object. In addition, the manifest section may also include additional attributes of the object which is not digested.

The signed manifest 400 includes a signer information block 420 that includes one or more signer information sections 421–423. The signer information block may describe a list of manifest sections in the manifest block 410. Each signer information section corresponds to a manifest section in the manifest block 410. A signer information section includes a reference to a corresponding manifest section, a name of a digest algorithm used to digest its corresponding manifest section, and the digested corresponding manifest section. The signer information section may also include an attribute section that may be used to record additional attributes of an object not described in the manifest section or an intent of a signer when signing the manifest section.

The signed manifest 400 includes a signature block 430. The signature block includes a digital signature computed by digesting the signer information block 420 with a digest algorithm and encrypting the digested signer information block with a private key. A signature block 430 also includes a name of the digest algorithm used to digest the signer information block.

The metadata names and the digest algorithms recorded in the manifest section and signature information section by an object integrity verification unit 300 (shown in FIG. 3) of a source device 110 (shown in FIG. 1) provide the instructions required by an the object integrity verification unit 300

(shown in FIG. 3) of a receiving device 120 (shown in FIG. 1) to verify the integrity of the transmitted signed manifest and object. FIG. 5 illustrates a table that shows exemplary metadata names and their definitions according to an embodiment of the present invention. The metadata name may be a token to describe a component of a referenced object to retrieve to perform a digest algorithm. The metadata name may indicate that a source address of the object, the entire content of the object, or a specific section of the object is digested. This is shown with metadata names 501–504. The metadata name may be a token to indicate that more than one correct digest value may be computed. For example, different documents may be returned based on a language preference set on a browser. The manifest section may include multiple digest values, one for each of the language representations for a document in an object. This is shown with metadata name 505. A metadata name may be a token to describe alternate locations where an object may be found. This is shown with metadata name 506. A metadata name may be a token that defines trusted signers for signed dynamic data sources where the signer is described in another manifest section in the signed manifest as an information resource. This is shown in name 507. It should be appreciated that more than one metadata name may be included in each manifest section or signer information section to describe an object.

Figure 6:
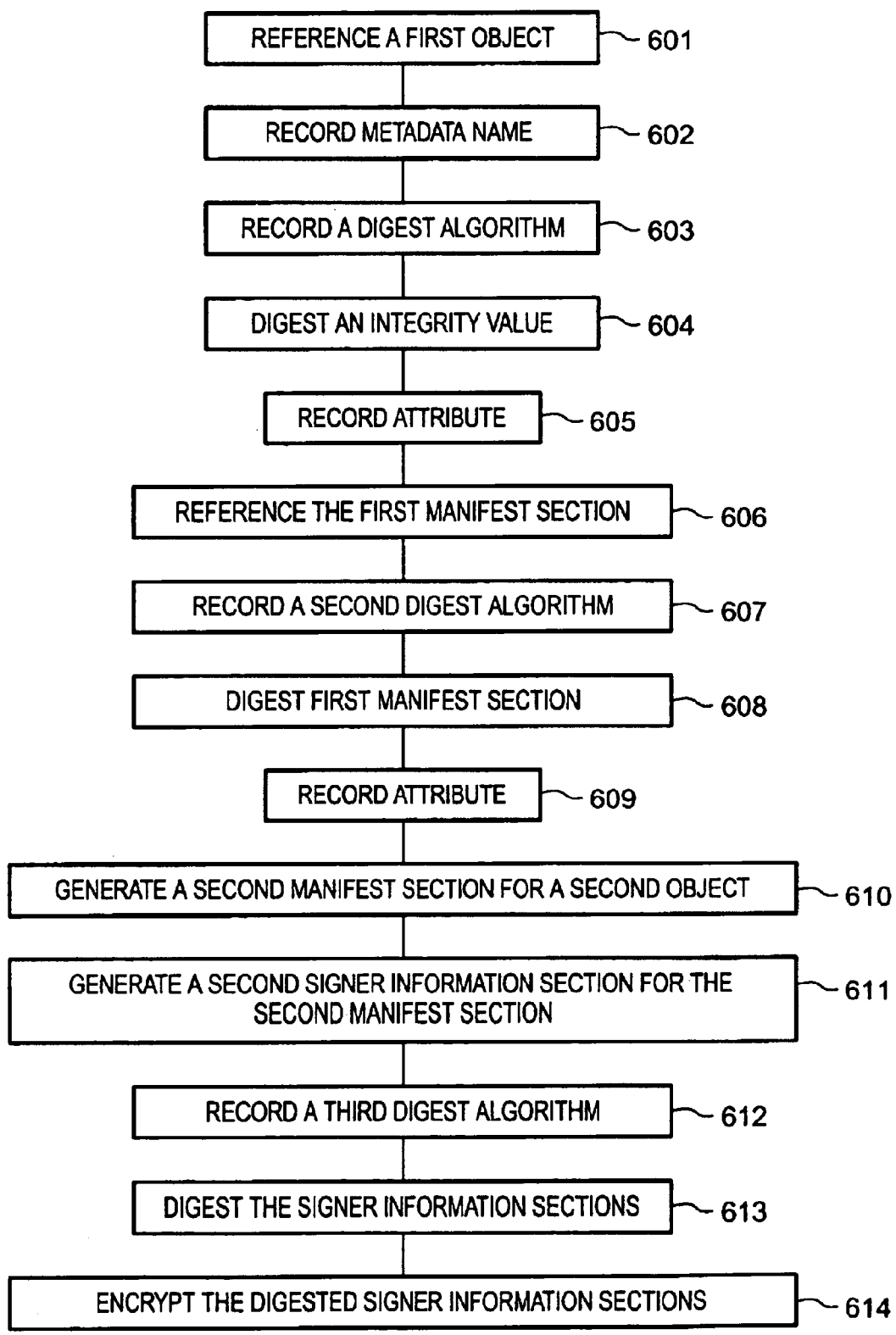
FIG. 6 is a flow chart illustrating a method for indexing objects according to an embodiment of the present invention.

FIG. 6 is a flow chart that illustrates a method for indexing objects according to an embodiment of the present invention. At step 601, a first object is referenced in a first manifest section. According to an embodiment of the present invention, the first object may be referenced by its name or other identifier.

At step 602, a metadata name is recorded in the first manifest section.

At step 603, a digest algorithm is recorded in the first manifest section.

At step 604, an integrity value belonging to the first object that corresponds to the metadata name is digested with the digest algorithm and recorded in the first manifest section.

At step 605, attributes of the object are recorded in the first manifest section;

At step 606, the first manifest section is referenced in a first signature information section.

At step 607, a second digest algorithm is recorded in the first signature information section.

At step 608, the first manifest section is digested with the second digest algorithm and recorded in the first signer information section.

At step 609, attributes of the object not recorded in the first manifest section are recorded in the signer information section.

At step 610, a second manifest section is generated for a second object. The second manifest section may be generated by performing steps similar to steps 601–605 described above. The second manifest section is linked to the first manifest section by the fact that both are written in a same manifest block in a signed manifest.

At step 611, a second signer information section is generated for the second manifest section. The second signer information section may be generated by performing steps similar to steps 606–609 described above.

At step 612, a third digest algorithm is recorded in a signature block.

At step 613, the first and second signer information sections are digested using the third digest algorithm.

At step 614, the digested first and second signer information sections are encrypted using a private key and written in the signature block.

Figure 7:
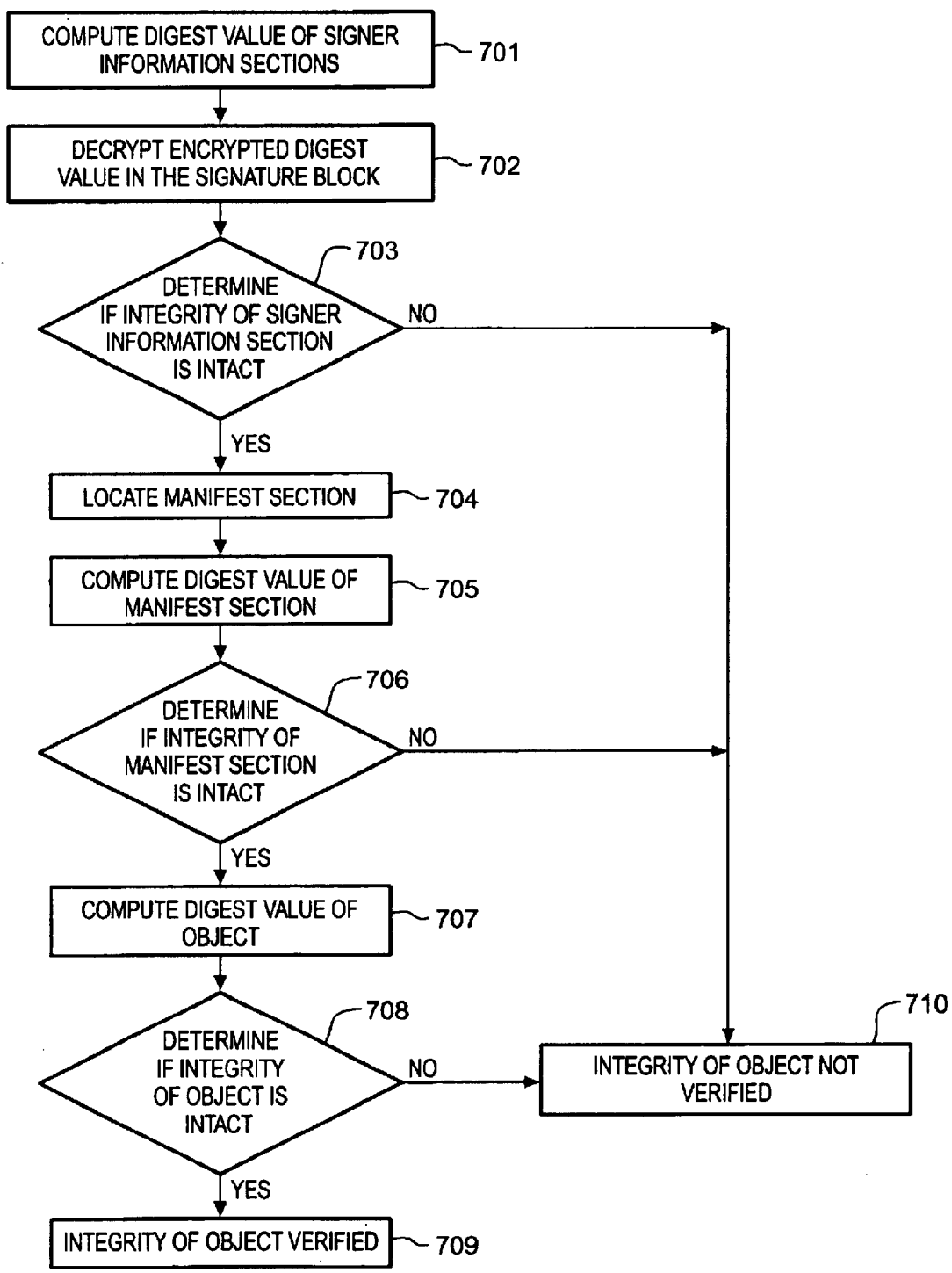
FIG. 7 is a flow chart illustrating a method for validating the integrity of an object according to an embodiment of the present invention.

FIG. 7 is a flow chart that illustrates a method for verifying the integrity of an object according to an embodiment of the present invention. At step 701, a digest value of the signer information section is computed. According to an embodiment of the present invention, the digest value is computed by digesting a signer information section with a digest algorithm recorded in the signature block.

At step 702, an encrypted digest value of the signer information section recorded in the signature block is decrypted using a public key.

At step 703, it is determined whether the integrity of the signer information section is intact. If the integrity of the signer information section is intact, control proceeds to step 704. If the integrity of the signer information section is not intact, control proceeds to step 710. According to an embodiment of the present invention, determining whether the integrity of the signer information section is intact is achieved by comparing the computed digest value of the signer information section with the digest value recorded in the signature block.

At step 704, a manifest section corresponding to the signer information section is located.

At step 705, a digest value of the manifest section is computed. According to an embodiment of the present invention, the digest value is computed by digesting the manifest section with a digest algorithm recorded in the signer information section.

At step 706, it is determined whether the integrity of the manifest section is intact. If the integrity of the manifest section is intact, control proceeds to step 707. If the integrity of the manifest section is not intact, control proceeds to step 710. According to an embodiment of the present invention, determining whether the integrity of the manifest section is intact is achieved by comparing the computed digest value of the manifest section with a digest value recorded in the signer information section.

At step 707, a digest value of the object is computed according to instructions in the manifest section. According to an embodiment of the present invention, the digest value is computed by digesting an integrity value corresponding to a metadata name recorded in the manifest section with a digest algorithm recorded in the manifest section.

At step 708, it is determined whether the integrity of the object is intact. If the integrity of the object is intact, control proceeds to step 709. If the integrity of the object is not intact, control proceeds to step 710. According to an embodiment of the present invention, determining whether the integrity of the object is intact is achieved by comparing the digest value computed with the digest value recorded in the manifest section. If the digest values match, the integrity of the object is presumed to be intact.

At step 709, the integrity of the object has been verified.

At step 710, the integrity of the object is not verified.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are, accordingly to be regarded in an illustrative rather than a restrictive sense.

What is claimed is:

1. A method comprising:

associating a first metadata name with a first object within a first manifest section of a signed manifest, the first metadata name classifying data associated with the first object;

determining a first integrity value for the first metadata name;

storing a first digest identifier of a first digest algorithm within the first manifest section;

digesting the first integrity value according to the first digest algorithm;

associating a second metadata name with a second object within a second manifest section of the signed manifest, the second metadata name classifying data associated with the second object;

determining a second integrity value for the second metadata name;

storing a second digest identifier of a second digest algorithm within the second manifest section; and digesting the second integrity value according to the second digest algorithm.

2. The method of claim 1 further comprising storing an attribute of the first object.

3. The method of claim 1, wherein associating the first metadata name includes storing in the first manifest section a source of the first object.

4. The method of claim 1, wherein associating the first metadata name includes storing within the first manifest section a section of the first object.

5. The method of claim 1, wherein associating the first metadata name comprises specifying a trusted signer.

6. The method of claim 1, further comprising generating a signer information section that corresponds to first the manifest section.

7. The method of claim 6, wherein generating the signer information section comprises:

referencing the first manifest section;

storing a third digest identifier of a third digest algorithm within the manifest; and digesting the first manifest section according to the third digest algorithm.

8. The method of claim 7, further comprising storing an attribute of the first object not found in the first manifest section.

9. The method of claim 7, further comprising generating a signature block that corresponds to the signer information section.

10. The method of claim 9, wherein generating the signature block comprises:

storing a fourth digest algorithm within the manifest;

digesting the signer information according to the fourth digest algorithm; and encrypting the digested signer information with a private key.

11. The method of claim 1, further comprising linking the first manifest section with the second manifest section in the same manifest.

12. A computing-device readable medium having stored thereon sequences of instructions, the sequences of instructions including instructions, which, when executed by a processor, causes the processor to:

reference a first object;

store a first metadata name for classifying data to be associated with the first object within a first manifest section of a signed manifest;

store a first digest identifier of a first digest algorithm within the first manifest section;

digest, with the first digest algorithm, a first integrity value for the first object determined with respect to the first metadata name;

reference a second object;

store a second metadata name for classifying data to be associated with the second object within a second manifest section of the signed manifest;

store a second digest identifier of a second digest algorithm within the second manifest section; and digest, with the second digest algorithm, a second integrity value for the second object determined with respect to the second metadata name.

13. The computer-readable medium of claim 12 further comprising instructions which, when executed by the processor, causes the processor to generate a first signature information section that corresponds to the first manifest section.

14. The computer-readable medium of claim 13, wherein generating the signature information section comprises instructions which, when executed by the processor, causes the processor to:

reference the first manifest section;

store a third digest identifier of a third digest algorithm; and digest the first manifest section with the third digest algorithm.

15. The computer-readable medium of claim 14 further comprising instructions which, when executed by the processor, causes the processor to generate a signature block that corresponds to the first signature information section.

16. The computer-readable medium of claim 15, wherein generating the signature block comprises instructions which, when executed by the processor, causes the processor to:

store a fourth digest identifier of a fourth digest algorithm;

digest the first signature information with the fourth digest algorithm; and encrypt the digested signature information with a private key.

17. An object integrity verification unit comprising:

a signed manifest manager to generate a manifest section for each object in a collection of multiple objects, the signed manifest manager further to store a metadata name providing for classifying information associated with an object and a digest identifier corresponding to a specific digest algorithm for the object within each manifest section of a signed manifest having a plurality of manifest sections; and a digest unit, coupled to the signed manifest manager, that digests an integrity value with each digest algorithm within each manifest section, the integrity value instantiating a value for the metadata name and being based at least in part on the metadata name's classification.

18. The object integrity verification unit of claim 17, further comprising an encryption/decryption unit, coupled to the signed manifest manager, that encrypts the digested integrity value.

19. A computer system, comprising:

a bus;

a processor coupled to the bus; and an object integrity verification unit, including:

a signed manifest manager to generate a manifest section for each object in a collection of multiple objects, the signed manifest manager further to store a metadata name providing for classifying information associated with an object and a digest identifier corresponding to a specific digest algorithm for the object within each manifest section of a signed manifest having a plurality of manifest sections; and a digest unit, coupled to the signed manifest manager, that digests an integrity value with the digest algorithm within the manifest section, said integrity value determined with respect to the metadata name.

20. The computer system of claim 19, wherein the object integrity verification unit further comprises an encryption/decryption unit, coupled to the signed manifest manager, that encrypts the digested integrity value.

* * * * *